June 27, 1933.　　O. R. SWEENEY　　1,915,874
METHOD OF PREVENTING THE GROWTH OF ALGÆ
Filed Dec. 20, 1929
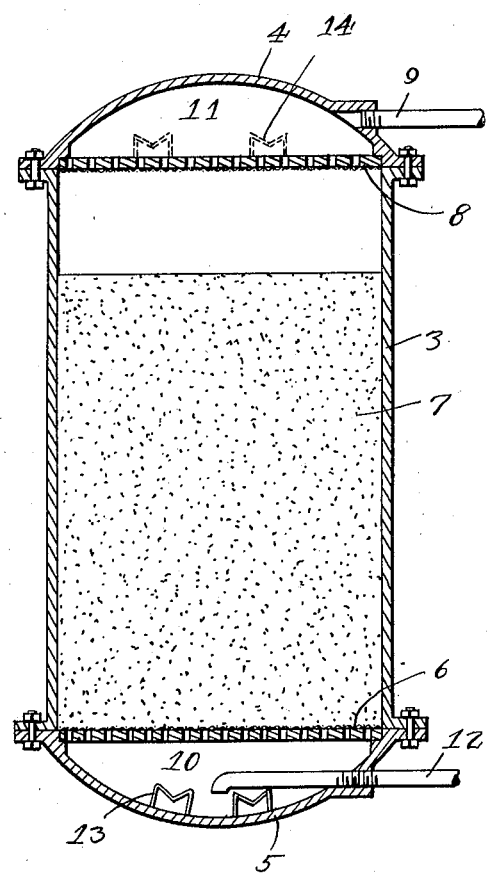
Inventor.
Orland Russell Sweeney
By
Wilson, Dowell, McCanna & Rehm
Attys.

Patented June 27, 1933

1,915,874

UNITED STATES PATENT OFFICE

ORLAND RUSSELL SWEENEY, OF AMES, IOWA, ASSIGNOR, BY MESNE ASSIGNMENTS, TO THE PERMUTIT COMPANY, OF WILMINGTON, DELAWARE, A CORPORATION OF DELAWARE

METHOD OF PREVENTING THE GROWTH OF ALGÆ

Application filed December 20, 1929. Serial No. 415,424.

My invention relates to the treatment of water and has special reference to the treatment thereof before the water passes through a base exchange softener for the purpose of preventing the growth of vegetation in the water or within the softener during the softening process or during periods when the softener is inactive.

There is a large class of vegetation which normally grows profusely in water and is usually found in lakes, slow moving streams and the like. When this water is passed through a base exchange softener the vegetation therein has a tendency to segregate in the base exchange material which acts more or less as a filter therefore. This occurs even though the water may have been filtered to remove the vegetation, since small particles still remain and are ready to grow under favorable conditions. A softener sometimes offers an almost optimum set of conditions for the growth of such vegetation, particularly during periods when it is practically inactive, such, for instance, as during the night when only relatively small amounts of water are drawn from domestic softeners. The growth of these organisms such as algæ, schizophyta, and the like, which I will designate generally as algæ, tend to produce highly unpleasant odors and nauseating tastes in the water in which they grow. In addition to the odor and taste, solid material is developed by their growth which may have a tendency to stop up valves and other mechanical devices positioned in the water lines, thus materially interfering with the functionion of the softener.

I have aimed to provide a process for the prevention of the growth of these types of vegetation in the water as it passes through the softener, whereby to prevent the development of unpleasant tastes and odors in the water during the softening process. I have also aimed to provide an apparatus for the softening of water wherein the growth of such organisms therein is substantially prevented and whereby the development of solid or gelatinous vegetation in the softener, which materially interferes with the operation thereof, is substantially prevented. I have aimed to provide improved means for supplying a toxic substance to the water entering the softener in such concentration as to be harmless to human life but effective for preventing the growth of vegetation.

Other objects and accompanying advantages will become apparent to those skilled in the art from the accompanying drawing and the following description.

The figure is a diagrammatic showing of a base exchange water softener embodying my invention.

I have found that the times most favorable for the growth of vegetation in the softener are those periods when little water is drawn therethrough, whereby a quantity of water remains in the softener for a prolonged period. This is probably due to two or more reasons. Since the water is not in motion and is not carried out of the softener during this period, vegetation has a greater time in which to grow unmolested. It is also probable that the temperature of the water in most domestic softeners is increased while it lies dormant in the softener, thus further accelerating the growth of vegetation. During this period the plants have time to develop sufficiently in size to be held by the bed of base exchange material thus providing seed vegetation for the subsequent water. I have found that there is no substantial amount of contamination in softeners wherein the water is carried through at a fairly uniform and rapid rate of flow.

While it has long been known that certain reagents are effective in killing this type of vegetation, it is also a fact that these reagents are, in the main, toxic to the human system if they occur in the water in any great concentration. If, however, the concentration of these reagents is kept low, they are not only unharmful to the human system, but they are probably helpful. The concentration which is fatal to the growth of algæ is far below the dangerous concentration which human beings can tolerate. In large scale operations it is feasible to employ a chemist or other expert to properly proportion, regulate, and check the dosage to stay well within the tolerance prescribed.

In a small household zeolitic water softener, or in a comparatively small industrial installation, it is obviously impractical to employ a man to proportion the dose and any machine for doing this is complicated. Any known device for feeding just the proper amount of these reagents automatically into the water in such quantities as to prevent the growth of algæ, makes the apparatus so complicated as to render it practically impossible of production at the prices for which such equipment must sell. In addition there is the danger that through accident or mistake an excessive quantity of the reagent might be fed to the water thereby rendering it toxic or poisonous for drinking purposes. I have, therefore, provided a process for the treatment of water wherein the substances adapted to prevent the growth of algæ are fed to the water automatically and whereby it is impossible to provide a concentration thereof sufficiently great to be injurious to the human system. I have found, for example, that one part of copper in ten million parts of water will effectively prevent the growth of most forms of this type of vegetation and that one part of copper in one million will kill algæ already present. I have also found that ordinary strips of copper placed in the hard water will produce a concentration of copper not higher than about one part in one million. On the other hand it requires about one part of copper in fifty thousand to be harmful to the human system. It will thus be seen that by passing the water entering the softener over metallic copper, the water may be caused to pick up sufficient copper ions to effectively prevent the growth of algæ. The concentration may even become such as to kill the vegetation present, yet at no time is it possible for the copper concentration to reach a point such as to render the water unfit for human consumption. This phenomenon is no doubt, partially due to chemical reactions between the materials dissolved in the water and the metallic copper, though the solubility of metallic copper in pure water is sufficient to bring about the desired results.

Referring to the figure, I have shown a base exchange softener designated generally by the numeral 3 having a removable top 4 and bottom 5 of conventional design. The usual screen or nozzle plate 6 is provided at the bottom of the softener to support a mineral bed 7. A second screen 8 may be provided above the bed to prevent the lighter portions of the base exchange substance from being carried into the effluent line 9. This construction provides a chamber 10 below the bed and a chamber 11 above the bed. Hard water may be conducted into the softener through the line 12. I have, pursuant to my invention, arranged to place portions of metallic copper 13 in the chamber 10 whereby the incoming water will be brought into contact therewith before passing through the bed of base exchange material. If desired, the metallic copper may be provided in sheet form wherein the corners or sides are bent downward to provide legs upon which the sheet metal may stand as indicated in the drawing. To further increase the surface and the circulation of water over the metal, slots or cuts may be provided in the copper sheet to permit the water to pass therethrough. The surface area of copper to be employed will, of course, depend upon the size of the softener and the amount of water to be passed through.

If the water during the normal operation of the softener enters the chamber 10 a small portion of the copper will be dissolved from the metallic copper portions 13 by the water passing over them. The quantity of copper picked up in this manner as the water passes through the softener, will ordinarily be sufficient to prevent the growth of algæ. If the water passes through very rapidly it will be immaterial whether or not a sufficient concentration of copper ions is obtained since the growth of algæ does not occur under these circumstances. However, when the rate of flow decreases to a point where there is any possibility of the growth of algæ in the softener the water in the chamber 10 will remain in contact with the metallic copper portions 13 a sufficient length of time to permit the concentration of copper ions in the water to reach a concentration sufficient to prevent such growth or to actually kill the algæ present. Ordinarily there will be a period, perhaps during the night, when water is not drawn from the softener. During this period the concentration of copper ions in the water contained in the chamber 10 will have reached considerable proportions, very nearly approximating one part in one million. When the first water is drawn from the softener the water contained in the chamber 10, having the high concentration of copper, will be forced up through the softener, killing any vegetation which may still have life therein.

It will be apparent that when my invention is employed in softeners wherein the flow of water is from top to bottom it will be necessary to place the metallic copper strips at the upper end of the softener as shown at 14 whereby the hard water entering through pipe 9 will be brought in contact with the copper before passing through the base exchange bed. The operation will otherwise be the same as in up flow softeners. If water is to be run through the softener in both directions it will be necessary to place these metallic copper portions on both ends of the softener, as will be obvious. I have found that the substance to be employed is not limited to metallic copper. For example, I have found that by fusing the oxide or sulfide of copper with sand, I can produce an insoluble compound of copper which will maintain a copper ion concentration somewhat higher than that of pure copper. Generally speaking, the metallic copper furnishes sufficient ions, but in case I desire a higher ion concentration, or in case I desire a higher rate of solution, such, for example, as in large softeners where the rate of flow is rapid, I may prefer to use such a copper compound. While I have found that the silicates of copper and metallic copper automatically furnish a satisfactory copper ion concentration and will never exceed the concentration which is dangerous to human beings, any copper compound which is so sparingly soluble that its concentration in still water never exceeds the safe toleranace of human beings, can be used in place of this copper silicate or the metallic copper. I do not, therefore, wish to limit myself to either copper or copper silicates.

The benefits to be derived from my invention are obvious. In communities where the water supply is drawn from sources contaminated with vegetation such as algæ, water softeners employed in small units for industrial and household use soon become contaminated with algæ. It is probably that the base exchange substance becomes quite thoroughly impregnated with this vegetation, as a result of which, all the water passing through the softener is given a foul taste and odor. In these instances it has been necessary to replace the zeolite involving great cost. For these small units no method has been known for the prevention of this phenomena. I have provided a very simple, automatic, and convenient means for accomplishing this purpose. The preventive substance may be placed in the softener by the manufacturer and has a life usually greater than the life of the softener. The process is such as to require no attention whatever from the operator. The process is at all times safe, there being no possibility of the water becoming over-dosed and consequently poisoning those who drink it. A continuous supply of material sufficient to normally prevent the growth of vegetation, is provided, accompanied by periodic supplies of sufficient concentration to kill the vegetation present.

While I have thus described and illustrated a specific embodiment of my invention I am aware that numerous alterations may be made therein and numerous substances perfected as a result of my disclosure many of which will fall within the spirit of my invention and I do not wish to be limited except as required by the prior art and the scope of the appended claim.

I claim:

A method of preventing growth of algæ in a base exchange water softener which comprises imparting to water in the receiving end of the softener a low copper ion concentration inhibitory to said growth, but below what would be harmful in the water for drinking purposes, by exposing said water to the action of a solid material containing a compound of copper with silica.

In witness of the foregoing I affix my signature.

ORLAND RUSSELL SWEENEY.